Figure 1:
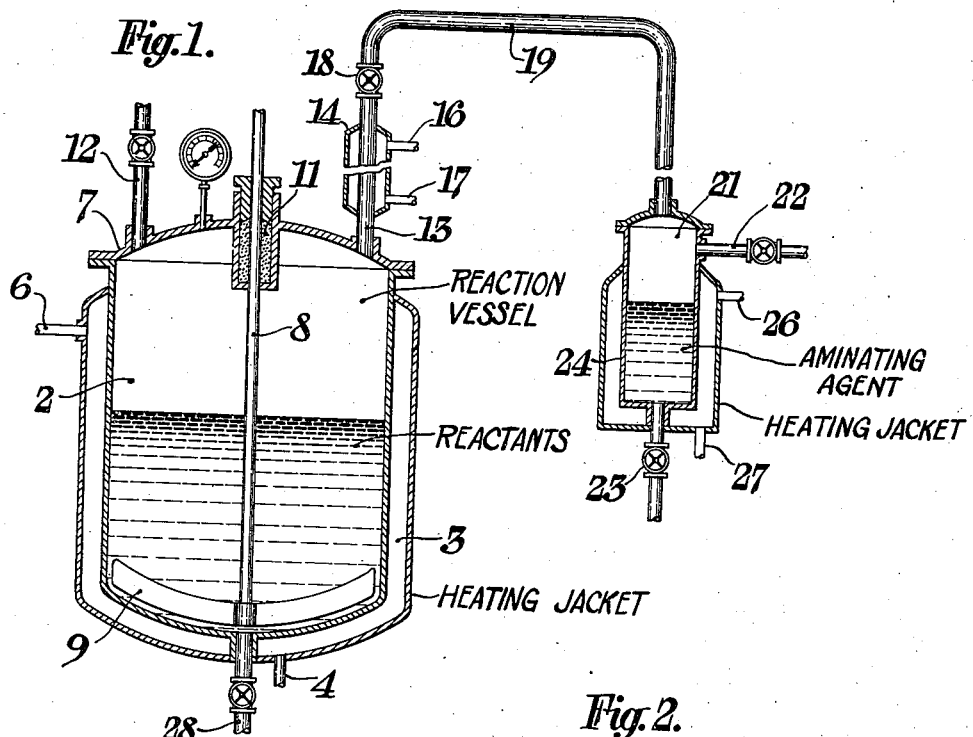

March 2, 1943.  L. G. DAVY  2,312,754
PROCESS FOR THE MANUFACTURE OF AMINO COMPOUNDS
Filed March 5, 1940

Lee G. Davy,
INVENTOR.
BY
N. M. Perrins
Daniel J. Mayne
ATTORNEYS.

Patented Mar. 2, 1943

2,312,754

UNITED STATES PATENT OFFICE 2,312,754

PROCESS FOR THE MANUFACTURE OF AMINO COMPOUNDS

Lee G. Davy, Kingsport, Tenn., assignor to Eastman Kodak Company, Rochester, N. Y., a corporation of New Jersey Application March 5, 1940, Serial No. 322,401

7 Claims. (Cl. 260—585)

This invention relates to processes for the manufacture of amino compounds, and more particularly for the manufacture of amines containing 3 to 5 carbon atoms by reactions carried out under pressure.

This application is a continuation-in-part of my application 99,606, filed August 10, 1936.

Amines are well-known chemical compounds which are used for various purposes such as chemical intermediates, photographic purposes, refrigerants, dyes and in the gasoline, oil and tanning industries, as well as various other industries. Various methods for the manufacture of amines are described in the literature but all of them have certain disadvantages which limit their usefulness in the preparation of amines in large scale manufacture. Frequently the desired amine is not the sole product of the reaction and the yield of the desired amine is not satisfactory. In some methods of manufacture the initial concentration of aminating agent must be so great as to cause excessive pressures in the reaction vessel if the concentration of the aminating agent at the time the reaction has progressed nearly to completion is to be high enough to give satisfactory yields. Other methods do not lend themselves readily to control when used on a large scale.

I have found a novel method and apparatus whereby the production of amines is improved and facilitated.

This invention has for an object to provide a process for producing various amino compounds, and in particular, primary amines of from 3 to 5 carbon atoms. An important object of the invention is to provide for easy and exact control of reaction pressures. A further object is to provide a simple, efficient process for the production of aliphatic amines and in particular normal butyl or amyl amines. A still further object is to provide a process for the production of aliphatic amines wherein the formation of undesired products is eliminated or kept to a minimum. Still another object is to provide a process for the production of amines wherein a catalyst may be employed. A still further object is to provide a pressure process for the production of various other amino compounds such as aldehyde amines, cyclic amines such as melamine and other compounds wherein ammonia is used in the preparation. Another object is to provide a pressure process involving the use of ammonia in which at least a part of the components are treated in the liquid phase.

Another object is to provide a novel apparatus suitable for the production of various amino compounds. Still another object is to provide an apparatus for bringing a material capable of being aminated or otherwise affected and an aminating agent into intimate contact under pressure. A further object is to provide an apparatus for the production of amines in which the reaction may be carried out under pressure with at least part of the reactants in the liquid phase. Other objects will appear hereinafter.

I have found a method for the production of amino compounds which may employ moderately high pressure, regularly and uniformly applied, that gives highly desirable results. I have found that a material may be used outside of the reaction zone to supply one of the reactants or a reagent under which it is desirable to conduct the reaction, and the temperature thereof may be so controlled that the pressure under which reaction is carried out may be easily and closely controlled.

For a better understanding of my invention, reference is made to the accompanying drawing which forms a part of the present application. Fig. 1 is a semi-diagrammatic side elevation view showing one form of apparatus for carrying out my invention. In this figure, certain parts are shown on section, in exaggerated scale, or broken away for clarity.

Figure 2:
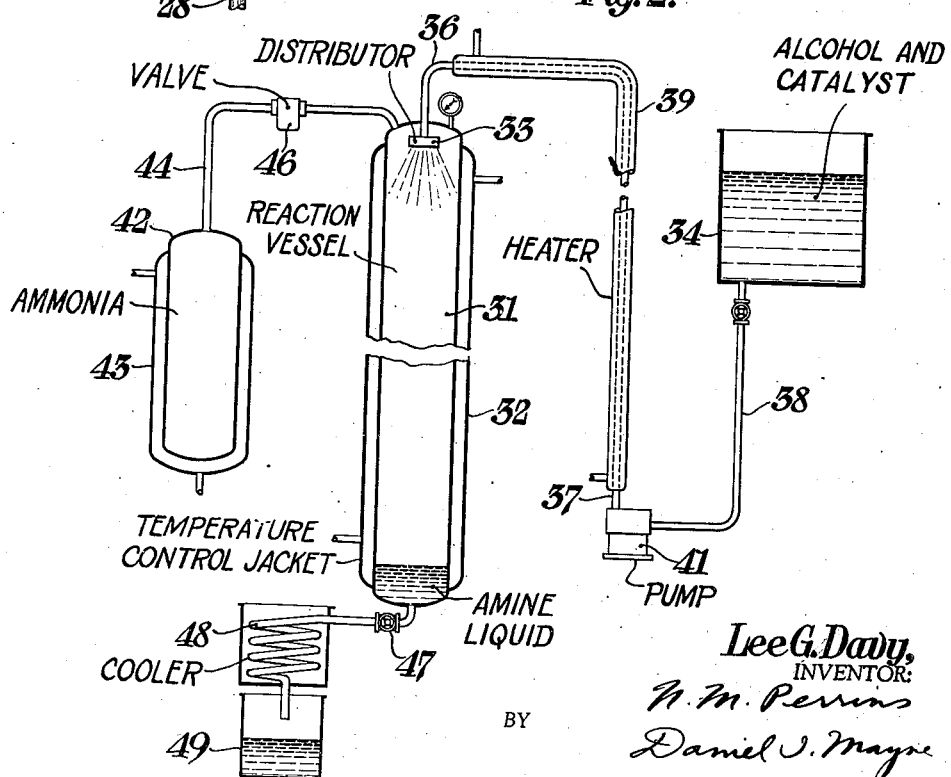

Fig. 2 is a view of a type similar to Fig. 1, but directed to a modified form of apparatus embodying my invention.

In Fig. 1, 2 represents a reaction vessel or chamber. This reaction unit may be in the form of an autoclave or other type pressure unit. The reaction chamber will include means for controlling the temperature thereof, such as the external jacket 3 to which steam or other fluid may be supplied and withdrawn by means of conduits 4 and 6.

The reaction unit will be provided with a closure 7. Extending through this closure and into the reaction chamber is an agitator shaft and blades 8, 9. Inasmuch as there will be a super-atmospheric pressure within the chamber, suitable glands, bearings and other construction will be provided at 11 to prevent leakage and permit the rotation of the agitating mechanism. Shaft 8 will be connected with a driving force not shown.

Extending through the closure 7 is a valved inlet conduit 12 through which materials to be treated may be introduced. Also connected with the reaction chamber is another inlet conduit 13, through which the aminating agent or agent under which it is desired to conduct the reaction, may be introduced into the reaction chamber. This inlet conduit may be provided with a condenser 14 to which cooling fluid may be supplied, and withdrawn at 16 and 17. This conduit may also include a suitable throttle valve 18 and is connected through conduit 19 to the pressure cylinder or tank 21.

Tank 21 includes a valved inlet conduit 22 and the valved draw-off conduit 23. The pressure tank 21 has associated therewith temperature controlling means such as the jacket 24 to which heating fluid may be supplied and withdrawn at 26 and 27.

Preferably, the inlet conduits 12 and 13 are connected with reaction chamber 2 at the upper portion thereof, inasmuch as the contents of the reaction chamber may be drawn off through the valved outlet conduit 28, thereby reducing losses of reactants through this draw-off.

In Fig. 2, 31 represents a modified elongated reaction pressure chamber. This chamber may be similar to reaction chamber 2 and include a temperature controlling jacket 32. In this modified form of reaction chamber, agitating means may be dispensed with and reaction contact obtained by spraying a reactant into the reaction chamber through distributor 33.

Distributor 33 is connected with a supply tank 34 by means of conduits 36, 37 and 38. A preheater or heat exchange may be provided at 39 as well as a suitable pump at 41 for forcing a reactant through distributor 33 into the reaction chamber.

Also attached to reaction chamber 31 is a pressure supply chamber 42, having associated therewith heating means 43. This pressure supply chamber is connected with reaction chamber 31 by means of conduit 44 which may include back pressure valve 46. Inasmuch as this portion of the apparatus is quite similar to the chamber 21 described with respect to Fig. 1, further description appears unnecessary.

The other extremity of reaction chamber 31 is provided with draw-off conduit 47 which may lead through a cooler 48 to the liquid collector 49.

In both the apparatus of Fig. 1 and Fig. 2, it is understood that thermometers, pressure valves and the like will be attached to the apparatus at necessary points to assist operators in controlling the reaction carried out in the apparatus. It is also understood that the various apparatus which I have described will be constructed from suitable alloy steels to withstand the action of the chemicals contained therein as well as to withstand the pressures applied to the equipment. Various alloys containing nickel, chromium, silicon, molybdenum, tungsten or various combinations of these elements with iron are available for constructing such equipment. It is also understood that the parts which are subjected to heat will be constructed of heat-resisting materials.

The operation of my novel apparatus and process for the manufacture of amines will be readily apparent from a consideration of the following examples which are set forth for the purposes of illustration.

An aliphatic alcohol such as normal butyl alcohol is charged into reaction chamber 2. Any catalyst suitable for the production of amines may be included therewith, such as for example, any of the catalysts described by Sabatier, or various other catalysts such as nickel and other hydrogenating metals or metal combinations may be employed. The reaction chamber is then connected with pressure vessel 21 into which a supply of ammonia has been introduced through valved conduit 22. The temperature of the ammonia in pressure chamber 21 is raised by the circulation of steam in jacket 24, until vapor pressure may reach around 500 to 1000 pounds per square inch.

The alcohol to be aminated in reaction chamber 2 is also heated to some temperature above that of chamber 21, and agitation supplied thereto by means of the device 8, 9. Since the temperature of the reactants in reaction vessel 2 is higher than the saturation temperature of the ammonia in chamber 21, the ammonia in reaction chamber 2 acts as a non-condensable gas and the reaction mixture in chamber 2 becomes saturated with ammonia at the pressure and temperature prevailing in reaction chamber 2. Thus the liquid ammonia in chamber 21 acts as a source of supply of reagent ammonia or as a vent chamber for reaction chamber 2, depending on conditions within reaction chamber 2 as the reaction progresses, and exact control of the pressure within reaction chamber 2 is readily achieved by control of the temperature within chamber 21. Condenser 14 is used to prevent the diffusion of reaction materials other than ammonia from reaction chamber 2 into chamber 21.

A liquid containing substantial amounts of normal butyl amine and small amounts of dibutyl amine may be withdrawn through valved conduit 28 either continuously or intermittently.

My invention may be employed for making various amines. Particularly satisfactory results are obtained in the manufacture of monoamyl amine from amyl alcohol and ammonia. In this instance the reaction may be carried out in the liquid phase within a temperature range of approximately 150°–250° C. Although this reaction temperature exceeds the critical temperature of ammonia, it would not exceed the critical temperature of any of the aliphatic alcohols. Therefore, by using suitable apparatus such as shown in either Fig. 1 or Fig. 2 of the attached drawing, the reaction may be carried out in the liquid phase under uniform and regulated pressure, thereby reducing or eliminating side reactions.

For example, in one run, 43 parts by weight of ammonia, 75–90 parts by weight of amyl alcohol and 14 parts by weight of a metallic nickel catalyst which had been prepared by reducing its oxide with hydrogen, were caused to react at approximately 200° C. and 800 pounds per square inch pressure. This pressure was obtained by heating the ammonia supply as already described. The reaction mixture was filtered and distilled to yield substantial amounts of monoamyl amine. No amylene was formed and no alcohol was lost. The alcohol recovered was used again without purification. Based on the alcohol consumed in the reaction, yields may be considered substantially quantitative.

In the above examples either the apparatus of Fig. 1 or Fig. 2 may be employed. In the event the apparatus of Fig. 1 is employed, the alcohol and catalyst would be supplied to the reaction chamber through conduit 12. That is, the reaction chamber 2 would be filled to the desired height with the material to be aminated and the valve in conduit 12 closed. The ammonia under pressure would be applied as described by heating of the ammonia supply. The temperature within the reaction chamber would generally be maintained above approximately 150° C. and up to three or four hundred degrees C. In the event the apparatus of Fig. 2 were employed, the mixture of alcohol and catalyst would be pumped under pressure through the spray head 33 where it would contact an atmosphere of ammonia maintained under regulated pressure by heating as already described.

While I may obtain various pressures within the reaction apparatus as high as 1600-1800 pounds per square inch, I find that by operating in accordance with my invention such high pressures are not necessary. Moderately lower pressures in the neighborhood of 400 to 1000 pounds per square inch are readily obtainable in accordance with my invention and have been found to be satisfactory.

Pressure employed in my process may be more easily obtained and more closely controlled than by other procedures.

While I have described reactions with respect to butyl and amyl alcohols because my process and apparatus are particularly adapted to the treatment of these materials, my invention has wider applications. Various other alcohols may be employed and the corresponding amines produced or aldehydes or ketones, hydrogen and ammonia may be reacted in my apparatus for the production of amines.

A further understanding of the application of my novel process to other materials will be apparent from the following additional illustrations. For example, ketones may be processed as follows:

A mixture containing about 319 grams of methyl ethyl ketone, 32 grams of water and 3 grams of nickel catalyst were introduced into the autoclave. This mixture undergoing agitation in the autoclave, was saturated with ammonia under a total pressure of about 100 pounds per square inch. At least a part of this pressure may be obtained by heating the ammonia outside of the reaction vessel but in communicative contact therewith through conduits 13 and 19. The temperature was raised from 47° C. (the temperature used during the ammonia saturation) to about 150° C. and then hydrogen was admitted. The hydrogenation was preferably carried out so that the total pressure in the autoclave was about 1000 pounds per square inch. The reaction took place with vigorous evolution of heat and substantially complete absorption of hydrogen was accomplished in about fifteen minutes. The temperature and pressure in the autoclave were maintained for about two hours, whereupon excess hydrogen and ammonia were released. If desired, for example, these components may be released back into a cooled cylinder by procedure described in greater detail in connection with other examples. The reaction mixture from the type process was submitted to distillation for recovering the desired amino compound. In this particular example mono secondary butyl amine of a 99-100% purity was obtained in yields greater than 92%.

Another example somewhat similar to the preceding also involving the treatment of ketones is as follows: The charge to the autoclave comprised methyl ethyl ketone, a small amount of water and catalyst. The water addition may comprise recovered ammonia liquor containing, for example, ammonia and butyl amine. Thereafter, anhydrous ammonia would be introduced into the reaction, the reaction mixture heated to 150° C. and hydrogen introduced. The reaction is conducted as in the preceding example and takes place quite rapidly. After several hours the amine content of the autoclave may be discharged through conduit 28 into a storage tank where the batch is held for 2-4 hours in order to permit the catalyst to settle out. Thereafter, the improved reaction mixture was decanted off and subjected to distillation in order to recover a relatively pure secondary amine. If desired, the amine purification may be conducted in accordance with U. S. application 99,978, Hasche & Davy, now U. S. Patent No. 2,180,006.

In the foregoing examples, if desired, a proportion or all of the ketone may be replaced by lower aliphatic aldehydes. The reaction of aldehydes or ketones with ammonia and hydrogen is described in Mignonac (Compt. rend. 172, 223 (1921).

However, it will be observed that in my process I obtain not only high yields, but yields relatively free from undesired amines. It has been found that contrary to disclosure of Mignonac, alcohol need not be employed as a solvent but preferably only a small quantity of water will be employed as above described. In addition, it will be observed that not only is there only a small amount of water present, but a high concentration of ketone and/or aldehyde is preferred. While the ammonia content in my processes exerts at least part of the pressure on the reaction, the amount of ammonia present in comparison to the materials to be acted upon is not of primary importance, but preferably there will be a slight excess of ammonia over the amount required to produce amination of all of the material to be aminated. In addition to not employing alcoholic solvent as suggested by Mignonac or any large quantities of water, it is preferred that the hydrogen pressure be sufficiently great to provide an atmosphere in the autoclave containing not less than about .15 mole fractions of hydrogen and preferably .40 mole fractions or more.

Although in the preceding examples the ammonia has partly or completely entered into the reaction to cause amination, my process may be applied to the treatment of various organic compounds wherein the ammonia may not actually aminate the organic compound. That is, the ammonia merely may provide an atmosphere in which the reaction takes place or perhaps may enter into some transitory combination with the organic compound being processed. An example of such a type process is the manufacture of melamine as follows: The reaction is carried out in a jacketed autoclave which is connected to a jacketed ammonia cylinder, all as described in connection with Fig. 1 of the attached drawing. A charge of dicyandiamide is introduced into autoclave 2 and the autoclave is purged free of air with ammonia gas introduced, for example, by opening valve 18. The autoclave is then closed and a pressure preferably in the neighborhood of 100 pounds per square inch is built up therein by heating the ammonia cylinder sufficient to drive the ammonia into conduit 19 through open valve 18 and conduit 13 into the autoclave. The temperature of the autoclave is raised simultaneously in order to keep the temperature of the contents of the autoclave above the saturation temperature in the ammonia cylinder.

After the reaction pressure has been obtained, the contents of the autoclave are heated to a suitable reaction temperature, namely, approximately 180°-200° C.

After the reaction has been completed the ammonia cylinder 21 is cooled as for example by passing a cooling fluid through the heating jacket 24, whereupon the unused excess ammonia becomes condensed in the ammonia cylinder. Valve 18 between the ammonia cylinder and the autoclave may then be closed and the autoclave vented either to the atmosphere or to an ammonia recovery system. The reaction product may then be worked up as desired.

It can be seen from this example how my invention can be used to provide close control over a reaction pressure in an easy and convenient manner. In the manufacture of melamine the reaction is exothermic and would cause dangerous pressures to be built up in the reaction chamber were it not for the access to the ammonia cylinder. It is not essential that valve 18 be kept open throughout the course of the reaction if the ammonia cylinder is cooled and valve 18 is used to bleed excess ammonia into the cooled ammonia cylinder in order to prevent the creation of excessive pressures. I prefer to provide continuous control of the reaction pressure, however, by maintaining a suitable temperature within the ammonia cylinder and providing access to the ammonia cylinder at all times during the reaction.

Ammonia (in either vaporous or liquid condition) has been described as the aminating agent as it is one of the most readily available materials. My invention embraces, when aminating, the use of other agents which cause amination such as amines, hydroxyl amines and the like.

From the foregoing, it is apparent that various changes may be made in my novel process without departing from the spirit or scope of this invention.

What I claim and desire to be secured by Letters Patent of the United States is:

1. A method for the manufacture of amines which comprises spraying a lower alkyl alcohol into contact with ammonia and in the presence of a catalyst in a reaction zone, reacting the aforementioned materials at a temperature between 150° C.-250° C., producing amine formation and under pressure of 400-1500 lbs. per square inch, and obtaining at least part of the pressure by adding at least a part of the ammonia outside of the reaction zone but in communicative contact with the reacting materials.

2. A method for the manufacture of amines which comprises contacting a lower alkyl alcohol capable of being aminated with an amination agent essentially comprising ammonia in a reaction zone, reacting the aforementioned materials at a temperature between 133° C. and 500° C. and under regulated pressure between 200-1500 lbs. per square inch, the pressure regulation being entirely obtained by heating an amination agent outside of the reaction zone but in communicative contact with the reacting materials.

3. A method for the manufacture of butyl amine which comprises contacting butyl alcohol having a content of catalyst therein, with ammonia in a reaction zone maintaining the reaction zone at a temperature between 150° C.-400° C. producing amine formation and under pressure between 200-1500 lbs. per square inch, and obtaining pressure by heating liquid ammonia outside of the reaction zone but in communicative contact therewith.

4. In a process for the manufacture of amines by procedure which includes reacting a lower aliphatic alcohol with ammonia, the reaction being conducted under pressure between 200 and 1500 pounds per square inch and at a temperature between 133° C. and 500° C. in a reaction zone in the presence of a catalyst for the reaction, the steps of obtaining at least a part of said pressure by heating the ammonia outside of said reaction zone, but in communicative contact therewith, separating the amines formed from unreacted alcohol and recycling unreacted alcohol to the process.

5. In a process for the manufacture of amines by procedure which includes reacting a lower aliphatic alcohol with ammonia, the reaction being conducted under amine-forming temperatures between 133° C. and 500° C. and superatmospheric pressures between 200 and 1500 pounds per square inch in a reaction zone in the presence of a catalyst dissolved in the alcohol, the steps which comprise obtaining at least a part of said pressure by heating the ammonia outside of said reaction zone, but in communicative contact therewith, and separating the catalyst from the reaction products by filtering.

6. In a process for the manufacture of amines by procedure which includes reacting at least one lower aliphatic alcohol with an amination agent essentially comprised of ammonia, the reaction being conducted under reaction temperatures between 133° C. and 500° C. and superatmospheric pressures between 200 and 1500 pounds per square inch in a reaction zone in the presence of a hydrogenation catalyst, the steps of obtaining a part of the pressure and control of pressure on the reaction by heating a source of the amination agent outside of said reaction zone, but in communicative contact therewith and, also, during the process reducing the pressure by applying cooling to said source of amination agent.

7. A process for the manufacture of amines by procedure which includes reacting a lower aliphatic alcohol with an amination agent essentially comprised of ammonia, the reaction being conducted under temperatures between 133° and 500° C. and superatmospheric pressures between 200 and 1500 pounds per square inch in the reaction zone in the presence of a metallic amination catalyst, the steps which comprise conducting the reaction at least part of the time in the presence of vigorous agitation and obtaining at least a part of the pressure by heating a source of said amination agent outside of the reaction zone, but in communicative contact therewith.

LEE G. DAVY.